United States Patent
Brown

(10) Patent No.: US 8,251,414 B2
(45) Date of Patent: Aug. 28, 2012

(54) TOW HOOK COVER HAVING TETHER HOOK

(75) Inventor: Bernard Patrick Brown, Farmington, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 159 days.

(21) Appl. No.: 12/887,914

(22) Filed: Sep. 22, 2010

(65) Prior Publication Data
US 2012/0066979 A1    Mar. 22, 2012

(51) Int. Cl.
*B60R 99/00* (2009.01)
(52) U.S. Cl. .................................................. 293/102
(58) Field of Classification Search ............ 293/102; 49/463
See application file for complete search history.

(56) References Cited

U.S. PATENT DOCUMENTS

| | | | |
|---|---|---|---|
| 2,836,215 A | 5/1958 | Rapata | |
| 3,604,052 A | 9/1971 | Bringer et al. | |
| 4,103,854 A | 8/1978 | Pliml et al. | |
| 6,945,617 B2 | 9/2005 | Wong | |
| 7,243,971 B1 | 7/2007 | McKeoun et al. | |
| 7,318,694 B2* | 1/2008 | Alexander | 410/104 |
| 7,891,714 B2* | 2/2011 | Takemura | 293/117 |
| 2005/0230940 A1* | 10/2005 | Alexander et al. | 280/730.1 |
| 2009/0039618 A1* | 2/2009 | Takemura | 280/507 |
| 2011/0088228 A1* | 4/2011 | Mineshima et al. | 24/682.1 |

* cited by examiner

*Primary Examiner* — Lori Lyjak
(74) *Attorney, Agent, or Firm* — Gifford, Krass, Sprinkle, Anderson & Citkowski, P.C.

(57) ABSTRACT

A tow hook cover for concealing an opening formed in a bumper cover of an automotive vehicle is provided. The tow hook cover includes a generally planar member having an outer surface and an opposite inner surface. A tether hook is disposed on the inner surface of the generally planar member. The tether hook has an elongated leg having a proximate end attached to the inner surface of the generally planar member and a distal end spaced apart from the inner surface. The distal end has a first arm extending generally normal from the elongated leg and a second arm defining an acute angle between the elongated leg and the second arm. Upon installation, the first arm extends through an aperture formed adjacent the tow hook opening prior to the second arm which deflects upon insertion.

17 Claims, 4 Drawing Sheets

TOW HOOK COVER HAVING TETHER HOOK

FIELD OF THE INVENTION

The invention relates generally to a bumper of an automotive vehicle and more particularly to a bumper having a tow hook cover.

BACKGROUND OF THE INVENTION

In order to tow an automotive vehicle in the event of an accident, malfunction, loss of gas, or being stuck in mud or snow, tow hook attachment points are provided on specific portions of the vehicle frame in order to safely tow the vehicle without any damage. Usually, the tow hooks are welded to the tow hook attachment points located on an underside of the vehicle. However, the use of preattached hooks can lessen the aesthetic appearance of the vehicle.

As such, modern automotive vehicles often provide tow hook attachment points located directly behind an opening in the bumper cover. The openings for the tow hook attachment points are covered with a tow hook cover in order to maintain the aesthetically pleasing appearance of the automotive vehicle. When the automotive vehicle is required to be towed, the tow hook covers are disengaged from the bumper cover and access to the tow hook attachment points is easily provided.

The tow hook covers also include a tether hook which retains the tow hook cover to the bumper cover after the tow hook cover has been disengaged avoiding the loss or misplacement of the tow hook cover during towing. Previous tether hooks are often molded integrally with the tow hook cover and include an elongated leg and a pair of arms extending acutely from the elongated leg in a generally arrow-type shape. The tether arrow is inserted into an aperture disposed adjacent to the openings in the bumper cover and remains connected with the bumper cover even after the tow hook cover has been disengaged from the opening.

As the previously known tow hook covers are molded from a plastic type material, the elongated leg typically has a thin construction, while the shorter pair of arms, defining the arrow shape, have a high deflection stress. During attachment, an assembly team member is required to attach the tow hook cover to the bumper cover by first inserting the tether hook into the aperture with enough force such that the pair of arms will deflect, allowing insertion of the tether hook into the aperture. As the pair of arms have a high deflection stress, an assembly team member is required to utilize a high insertion load in order to connect the tether hook into the aperture. However, the thin construction of the elongated leg results in the deflection of the elongated leg during the insertion of the tether hook. This results in a time-consuming process as many of the elongated shafts of the tow hooks deform during installation.

Thus there exists a need for an improved tow hook cover having a tether hook which is easily installed during assembly.

SUMMARY OF THE INVENTION

The present invention provides an improved tow hook cover which overcomes the above-mentioned disadvantages of the previously known tow hook covers.

In brief, a tow hook cover for concealing an opening formed in a bumper cover of an automotive vehicle is provided. The tow hook cover includes a generally planar member having an outer surface and an opposite inner surface. A tether hook is disposed on the inner surface of the generally planar member. The tether hook has an elongated leg having a proximate end attached to the inner surface of the generally planar member and a distal end spaced apart from the inner surface. The distal end has a first arm extending generally normal from the elongated leg and a second arm defining an acute angle between the elongated leg and the second arm. Upon installation, the first arm extends through an aperture formed adjacent the tow hook opening prior to the second arm which deflects upon insertion.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which.

DETAILED DESCRIPTION OF A PREFERRED EMBODIMENT OF THE PRESENT INVENTION

The present invention has utility as a tow hook cover having a tether hook which overcomes the above-mentioned disadvantages. The inventive tow hook cover provides an assembly team member with a tether hook which is capable of easy installation and which avoids deformation during assembly.

Figure 1:
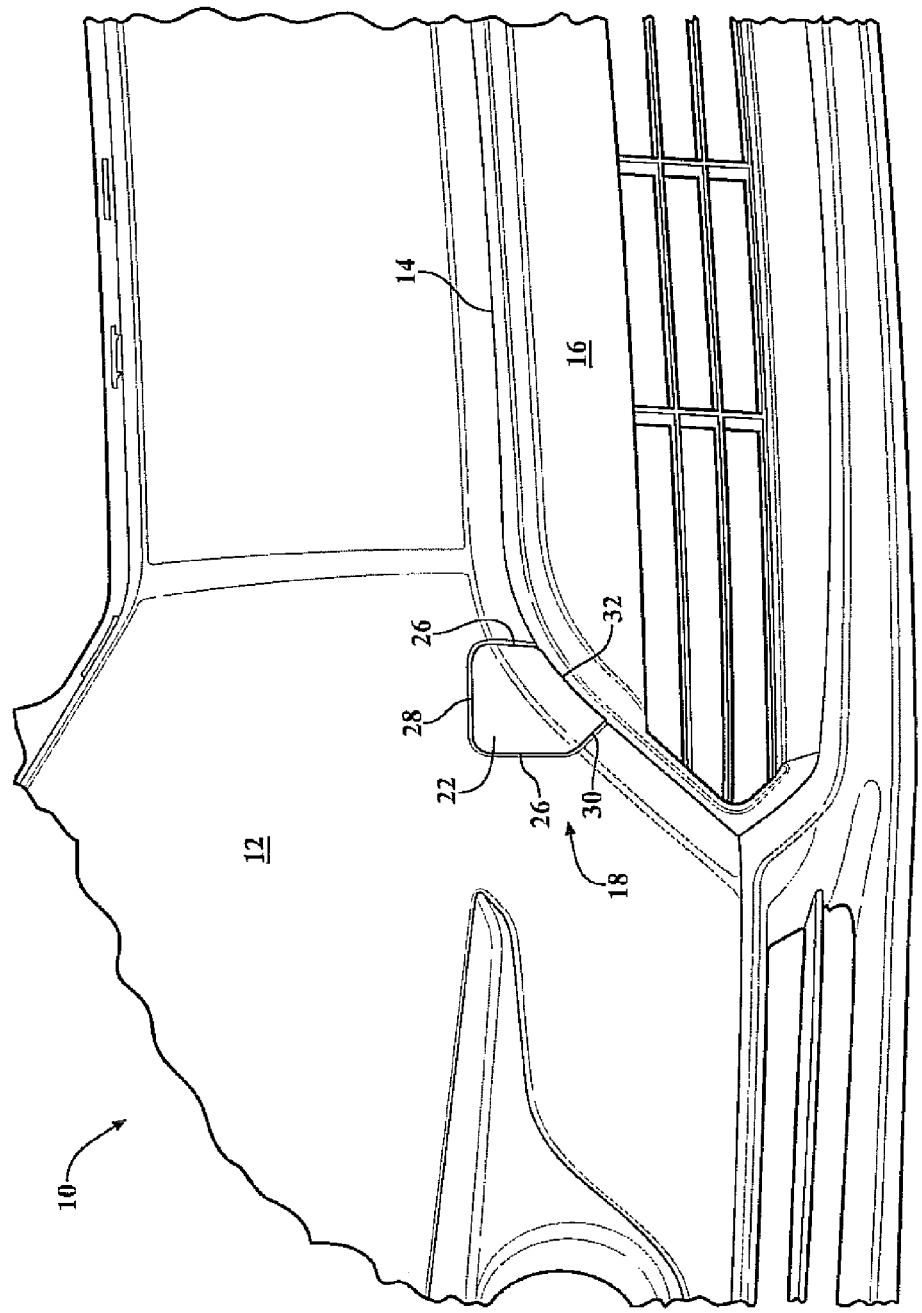
FIG. 1 is a partial perspective view illustrating an automotive vehicle bumper having a tow hook cover.

With reference to FIG. 1, a bumper cover is generally indicated at 10. The bumper cover 10 is attached to either the front or rear of the automotive vehicle and includes a contoured exposed surface 12 to provide an aesthetically pleasing appearance to the automotive vehicle. The bumper cover 10 includes an edge 14 which defines a boundary between the bumper cover 10 and a grille portion 16. A tow hook cover 18 attaches to the bumper cover 10 so as to be flush with the exposed surface 12. It is appreciated, that although only one tow hook cover 18 is depicted, a second tow hook cover 18 is positioned symmetrical to the first tow hook cover 18 on the bumper cover 10.

Figure 2:
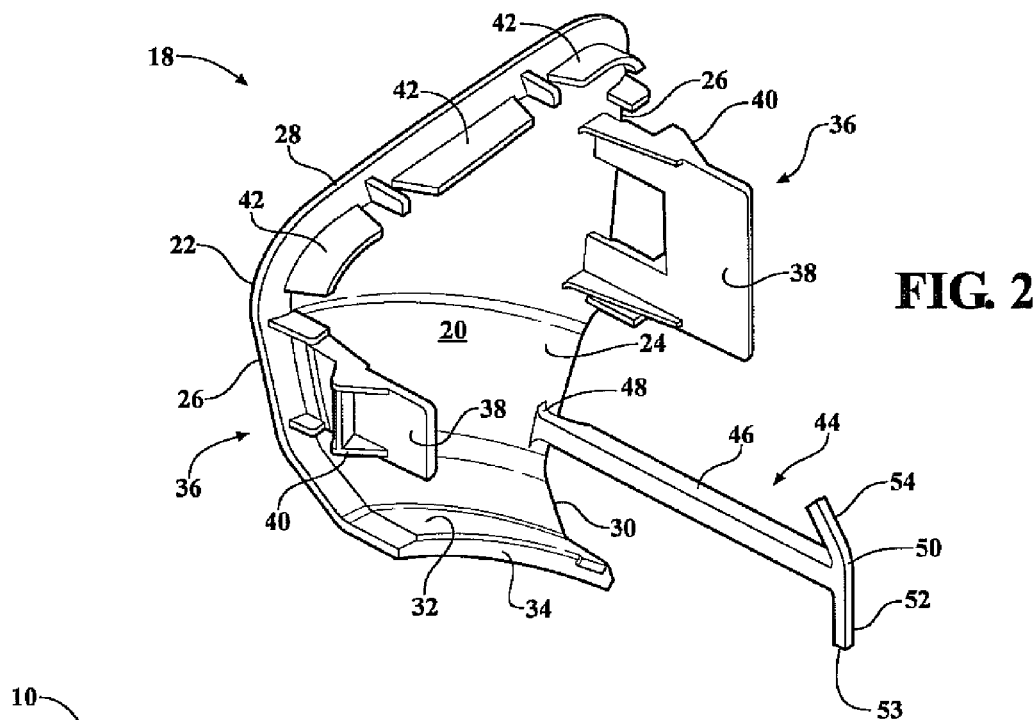
FIG. 2 is a perspective view illustrating the inventive tow hook cover.

As seen in FIG. 2, the tow hook cover 18 includes a generally planar member 20. The generally planar member 20 of the tow hook cover 18 includes an outer surface 22 and an opposite inner surface 24. It is the outer surface 22 of the tow hook cover 18 which extends flush with the exposed surface 12 when the tow hook cover 18 is connected to the bumper cover 10.

The generally planar member 20 of the tow hook cover 18 includes a pair of opposing sides 26, a first edge 28, a second edge 30, and a lip portion 32. The first edge 28 traverses a first end of the pair of opposing sides 26, and the second edge 30 in conjunction with the lip portion 32 traverses the second end of the opposing pair of sides 26. The lip portion 32 includes a rim edge 34 which extends generally normal from the generally planar member 20. The lip portion 32 and the rim edge 34 correspond in shape and curvature to the edge 14 of the bumper cover 10 such that upon engagement of the tow hook cover 18 with the bumper cover 10, the lip portion 32 and the rim edge 34 extend flush with the edge 14.

A clip 36 is positioned on each of the pair of opposing sides 26. Each of the clips 36 includes a tab 38 extending outwardly in a generally normal direction from the inner surface 24 of the generally planar member 20. A ramp portion 40 is positioned on the exterior sides of each of the tabs 38 to provide the clips 36 with a snap fit connection to the bumper cover 10 as described in greater detail below.

A plurality of ridges 42 extend outwardly from the inner surface 24 of the generally planar member 20 adjacent the first edge 28. The ridges 42 and the rim edge 34 are used to space the tow hook cover 18 a predetermined distance from the bumper cover 10.

The tow hook cover 18 includes a tether hook 44 disposed on the inner surface 24 of the generally planar member 20. The tether hook 44 includes an elongated leg 46 having a proximate end 48 and a distal end 50. The elongated leg 46 is dimensioned such that the distal end 50 extends beyond both the clips 36 and the rim edge 34. The proximate end 48 is connected to the inner surface 24 of the tow hook cover 18. A first arm 52 extends from the distal end 50 of the elongated leg 46 such that the first arm 52 and the elongated leg 46 define a generally normal angle. The first arm 52 includes a terminal end 53. A second arm 54 extends from the distal end 50 on a side opposite the first arm 52. The second arm 54 and the elongated leg 46 define an acute angle such as a generally 45° angle. The position of the first arm 52 and the second arm 54 allow for a decrease in the insertion load required for installation of the tether hook 44 as will be described in greater detail below.

Figure 3:
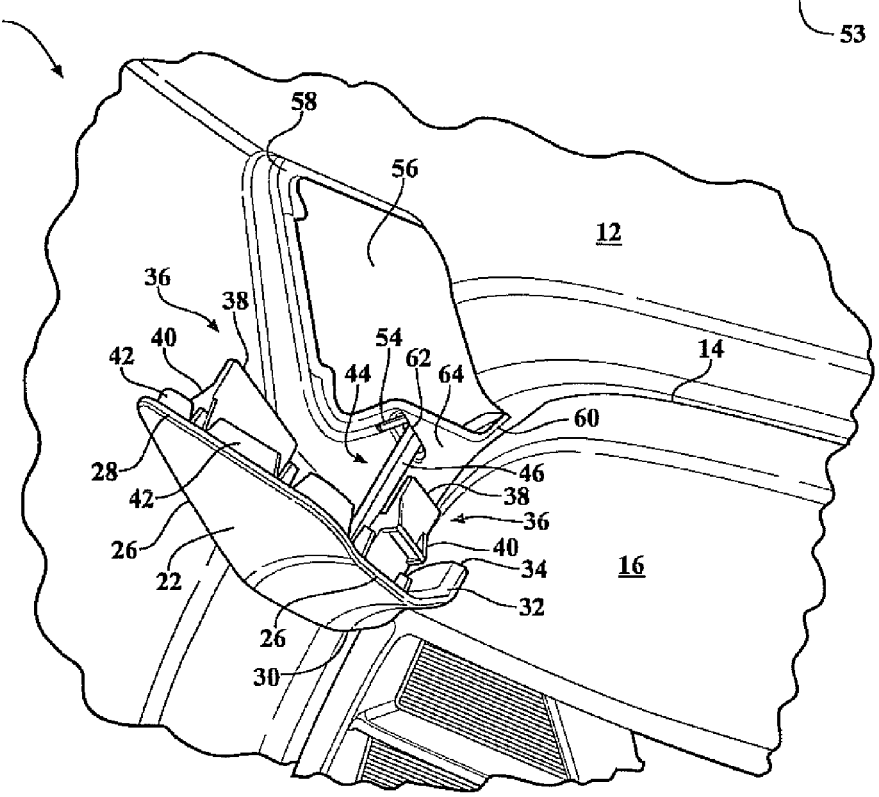
FIG. 3 is a partial perspective view illustrating the insertion of the tether hook into the bumper cover.

With reference to FIG. 3, an opening 56 is formed in the bumper cover 10. The opening 56 is partially bounded by a stepped portion 58 which spaces the opening a predetermined distance from the exterior surface 12 of the bumper cover 10. An extension 60 formed of a portion of the edge 14 separates the opening 56 from the grille portion 16. An elongated aperture 62 is provided in a flange 64 formed in the stepped portion 58. The flange 64 being spaced apart from the exterior surface 12 of the bumper cover 10. The aperture 62 is dimensioned to receive the tether hook 44 as described in greater detail below.

Figure 5:
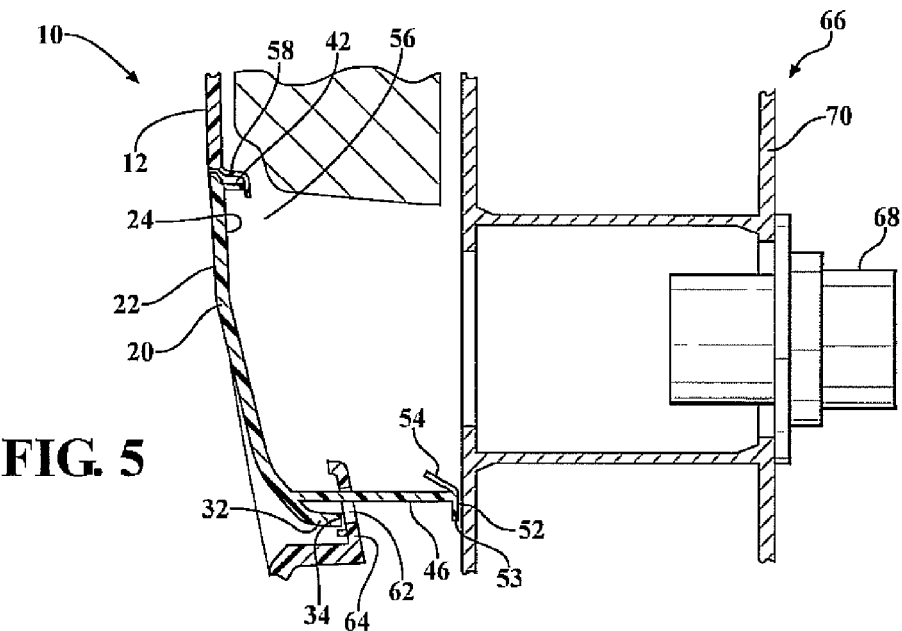
FIG. 5 is a partial cross-sectional view illustrating the tow hook cover engaged within the bumper cover.
Figure 6:
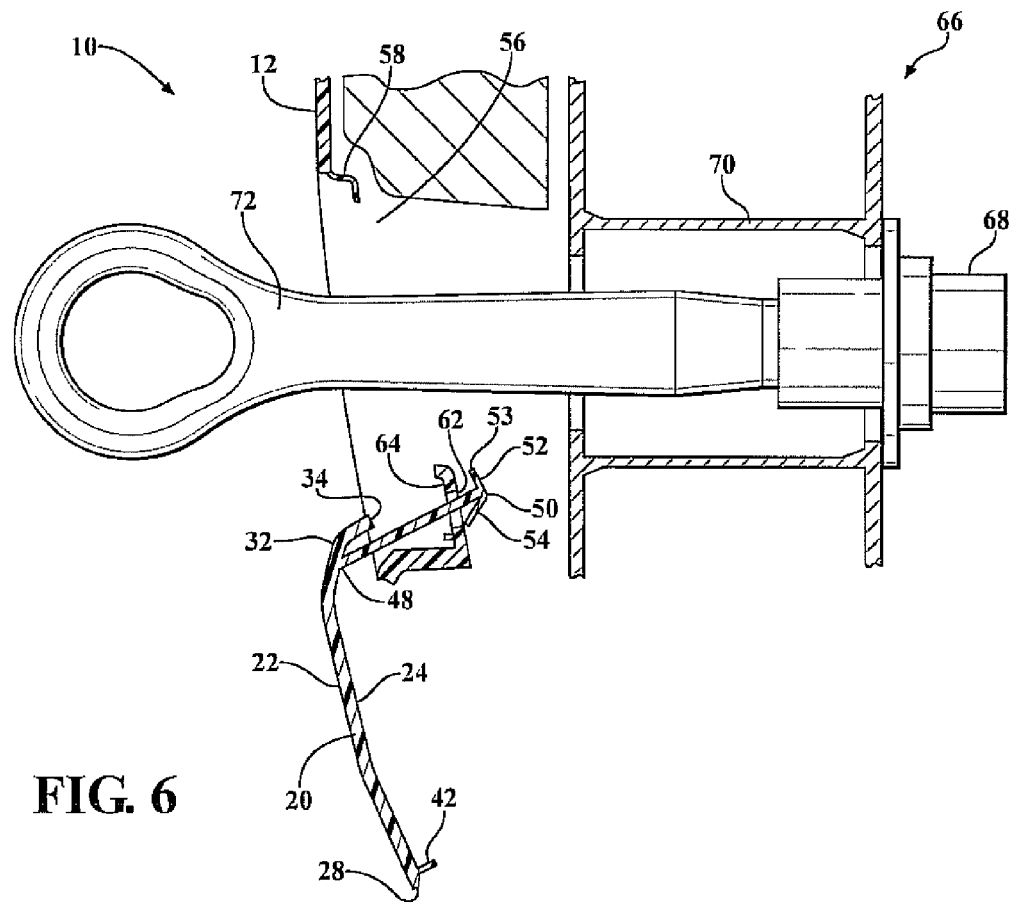
FIG. 6 is a partial cross-sectional view illustrating an eyelet inserted in through the attachment point and the tow hook cover disengaged from the attachment opening.

With reference to FIGS. 5 and 6, the opening 56 is positioned on the bumper cover 10 so as to provide access to the tow hook attachment point 66. The tow hook attachment point 66 includes a connector 68 which is affixed to a reinforcing beam 70 capable of properly withstanding the stress associated with towing the vehicle. In the illustrated embodiment, the connector 68 is in the form of a female threaded connector which is welded, bolted, adhered, or optionally formed integrally with the reinforcement beam 70. The reinforcement beam 70 is typically a portion of the automotive vehicle frame or in the alternative any other support structure attached to the frame capable of undergoing the towing stress.

Prior to towing, the tow hook cover 18, specifically the clips 36, is disengaged from the opening 56, yet is retained to the bumper cover 10 by the interaction between the tether hook 44 and the aperture 62, as seen in FIG. 6. A tow hook 72, in the form of a hook or an eyelet as seen in FIG. 6, having a male threaded end is connected to the connector 68 to provide a proper place to tow the vehicle without damaging the vehicle.

Figure 4:
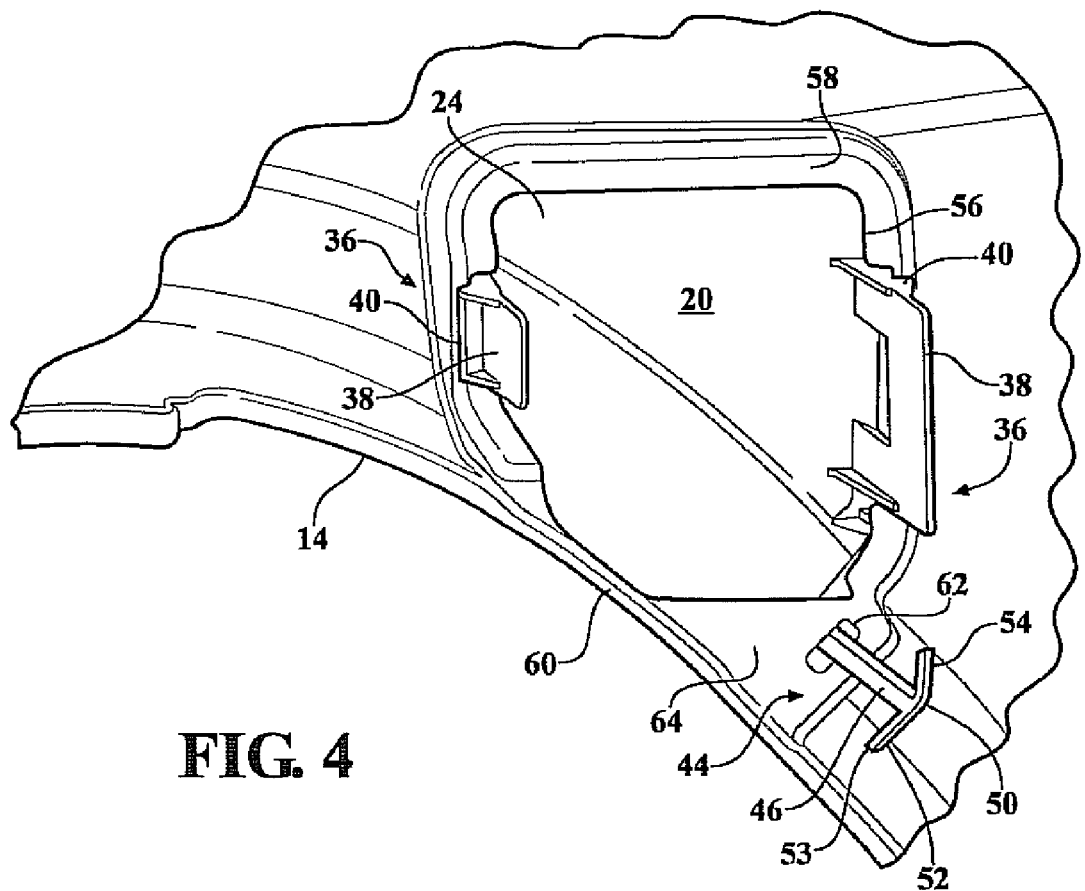
FIG. 4 is a rear view illustrating the tow hook cover engaged within the bumper cover.

In order to facilitate a better understanding of the present invention, the installation of the tow hook cover 18 to the bumper cover 10 will now be discussed. During the installation process an assembly team member first introduces the terminal end 53 of the first arm 52 into the aperture 62. Once the first arm 52 has been inserted into the aperture 62 the assembly team member rotates the tow hook cover 18 into the position illustrated in FIG. 3. The assembly team member then inserts the tether hook 44 by pushing forward until the second arm 54 deflects and an interference fit between the second arm 54 and the aperture 62 is provided, as seen in FIGS. 4, 5 and 6. The unique configuration of the tether hook 44 allows for a significant decrease in the force required to attach the tether hook 44 to the aperture 62. Thus, reducing the deflection of the elongated leg 46.

After insertion of the tether hook 44, the tow hook cover 18 is connected to the bumper cover 10, even though the tow hook cover 18 is not engaged with the opening 56. As seen in FIG. 6, the insertion of the tether hook 44 allows the tow hook cover 18 to remain connected to the bumper cover 10 during towing, thereby reducing the occurrences of lost or misplaced tow hook covers 18 during towing. The elongated leg 46 of tether hook 44 rotates within the aperture 62 such that the tow hook cover 18 hangs below the opening 56 to provide access to the attachment point 66.

Once the tow hook cover 18 has been inserted into the aperture 62, the assembly team member then engages the tow hook cover 18 with the opening 56 by inserting the clips 36 into the opening 56 until a snap fit engagement with the opening 56 is provided, as seen in FIG. 4. The ramp portions 40 of the clips 36 deflect the tabs 38 allowing the ramp portions 40 to snap fit with the perimeter of opening 56. When the tow hook cover 18 is engaged with the opening 56, the ridges 42 abut the stepped portion 58 to properly space the generally planar member 20 of the tow hook cover 18 from the opening thereby providing the outer surface 22 of the tow hook cover 18 flush with the exterior surface 12 of the bumper cover. In addition, the rim edge 34 abuts the extension 60 allowing the lip portion 32 to be flush with the edge 14 and form a portion of the edge 14 to separate the bumper cover 10 from the grille portion 16.

It will be appreciated, of course, that the tow hook cover 18 is molded from a plastic type material as a one piece monolithic structure.

From the foregoing, it can be seen that the present invention provides a tow hook cover which decreases the insertion load required to install the tether hook during assembly. Having thus described the invention, however, many modifications thereto will become apparent to those skilled in the art to which it pertains without deviation from the spirit of the invention as defined by the scope of the appended claims.

The invention claimed is:

1. A tow hook cover for a concealing an opening formed in a bumper cover of an automotive vehicle for housing a tow hook, said tow hook cover comprising:
   a member adapted to cover the opening; and
   a tether hook having an elongated leg having a proximate end attached to an inner surface of said member and a distal end spaced apart from said inner surface, said distal end having a first arm extending generally normal from said elongated leg and a second arm defining an acute angle between said elongated leg and said second arm.

2. The tow hook cover of claim 1, wherein said first arm extends through an aperture of the bumper cover prior to said second arm.

3. The tow hook cover of claim 2, wherein said second arm deflects upon insertion into the aperture.

4. The tow hook cover of claim 3, wherein said tow hook cover includes a pair of clips disposed on opposite sides of said member, said pair of clips connecting said tow hook to the opening in the bumper cover.

5. The tow hook cover of claim 1, wherein said tow hook cover includes a lip portion having a rim edge, said lip portion extending generally normal to said member.

6. The tow hook cover of claim 5, wherein said rim edge contacts the bumper cover when said tow hook cover is engaged with the opening.

7. A bumper for an automotive vehicle comprising:
a bumper cover having an exterior surface, said bumper cover having an opening for housing a tow hook and an aperture positioned adjacent said opening;
a reinforcement beam positioned adjacent said bumper cover, said reinforcement beam having an attachment point aligned with said opening of said bumper cover; and
a tow hook cover having a member adapted to cover said opening and a tether hook, said tether hook having an elongated leg having a proximate end attached to an inner surface of said member and a distal end spaced apart from said inner surface, said distal end having a first arm extending generally normal from said elongated leg and a second arm defining an acute angle between said elongated leg and said second arm.

8. The bumper of claim 7, wherein said first arm extends through said aperture of said bumper cover prior to said second arm.

9. The bumper of claim 8, wherein said second arm deflects upon insertion into said aperture.

10. The bumper of claim 7, wherein said tow hook cover includes a pair of clips disposed on opposite sides of said member, said pair of clips connecting said tow hook to said opening in said bumper cover.

11. The bumper of claim 7, wherein said opening is bound by a stepped portion and wherein said tow hook cover includes at least one ridge extending outwardly from said inner surface to position said inner surface of said tow hook cover a predetermined distance apart from said stepped portion.

12. The bumper of claim 7, wherein said aperture has an elongated shape.

13. The bumper of claim 7, wherein said bumper cover has an edge defining a grille portion and wherein said tow hook cover includes a lip portion having a rim edge which defines a portion of said grille portion when said tow hook cover is engaged with said bumper cover.

14. The bumper of claim 13, wherein a portion of said edge is formed from an outer surface of said lip portion.

15. The bumper of claim 14, wherein said lip portion extends towards said reinforcement beam.

16. The bumper of claim 15, wherein said rim edge contacts a portion of said bumper cover when said tow hook cover is engaged with said bumper cover.

17. The bumper of claim 7, wherein said reinforcement beam includes a connector for receiving a tow hook.

* * * * *

UNITED STATES PATENT AND TRADEMARK OFFICE
CERTIFICATE OF CORRECTION

| | | |
|---|---|---|
| PATENT NO. | : 8,251,414 B2 | Page 1 of 1 |
| APPLICATION NO. | : 12/887914 | |
| DATED | : August 28, 2012 | |
| INVENTOR(S) | : Brown | |

It is certified that error appears in the above-identified patent and that said Letters Patent is hereby corrected as shown below:

In the Specification

Col. 4, line 54: replace "for a concealing" with --for concealing--.

Signed and Sealed this
Seventh Day of January, 2014

Margaret A. Focarino
*Commissioner for Patents of the United States Patent and Trademark Office*